June 17, 1947. C. B. DE VLIEG 2,422,475
METHOD OF AND MACHINE FOR GRINDING
Filed May 11, 1944 5 Sheets-Sheet 1
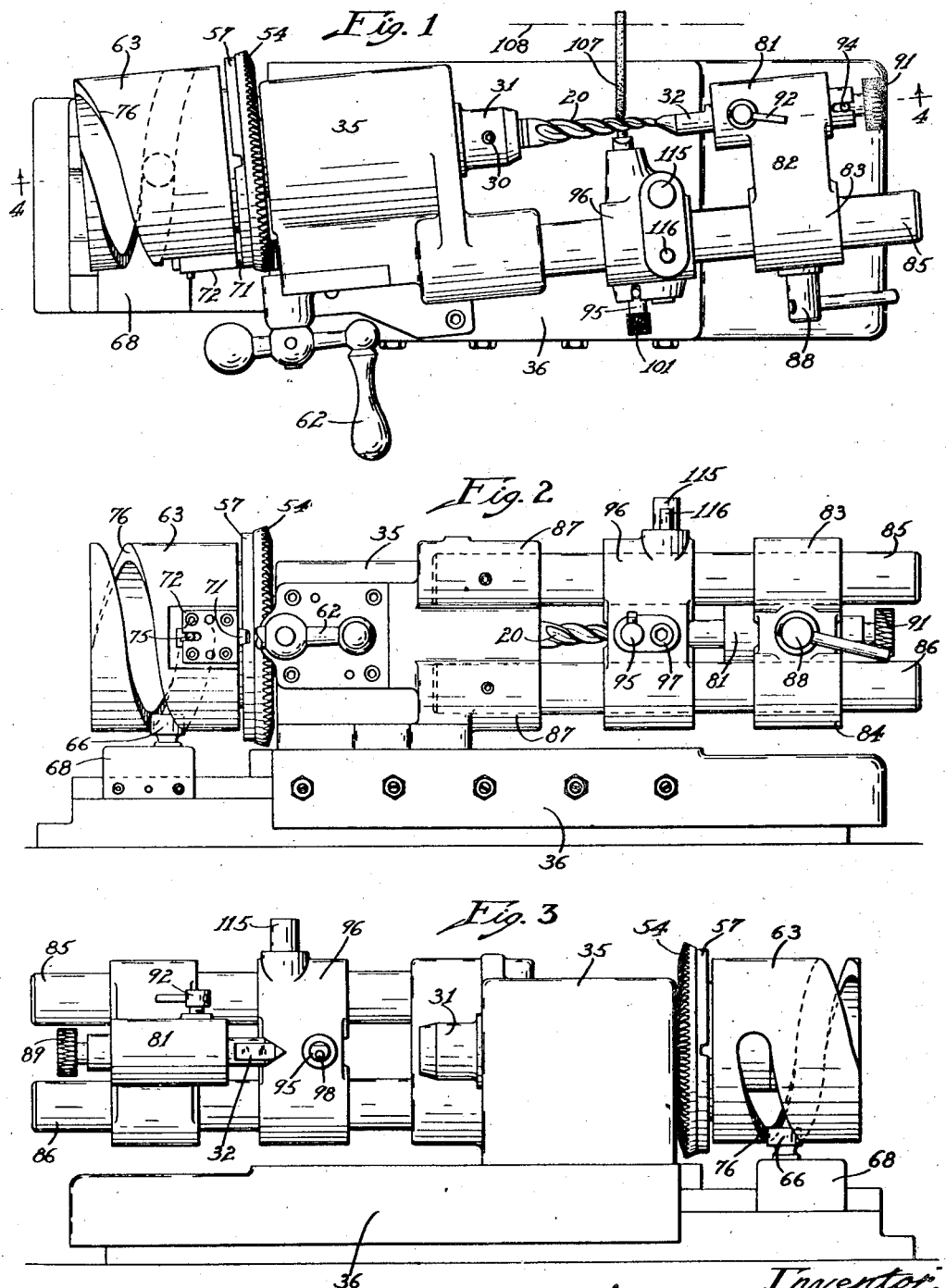

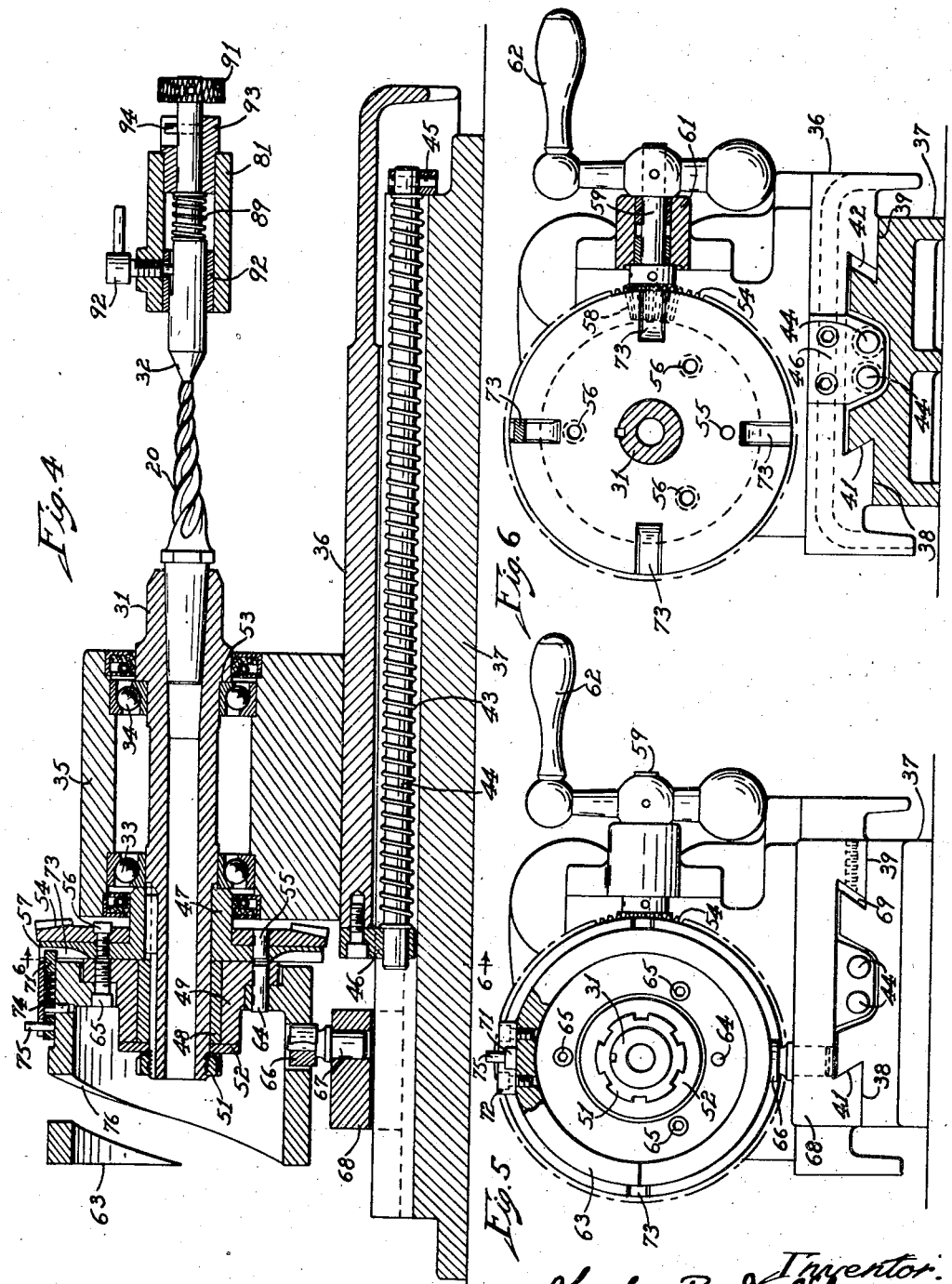

June 17, 1947.  C. B. DE VLIEG  2,422,475
METHOD OF AND MACHINE FOR GRINDING
Filed May 11, 1944  5 Sheets-Sheet 3
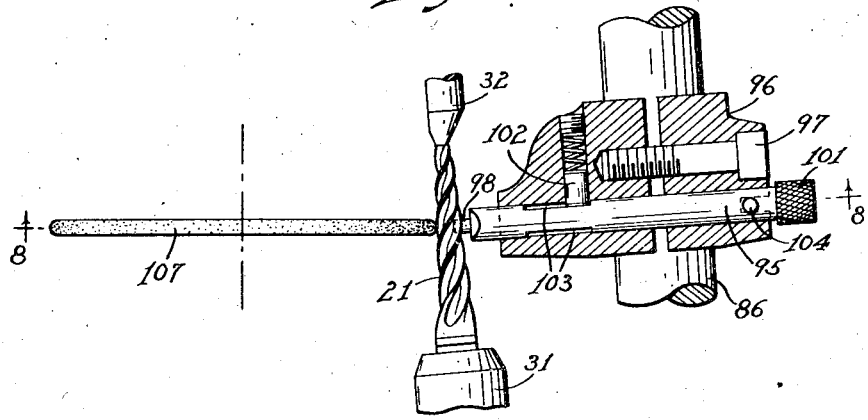
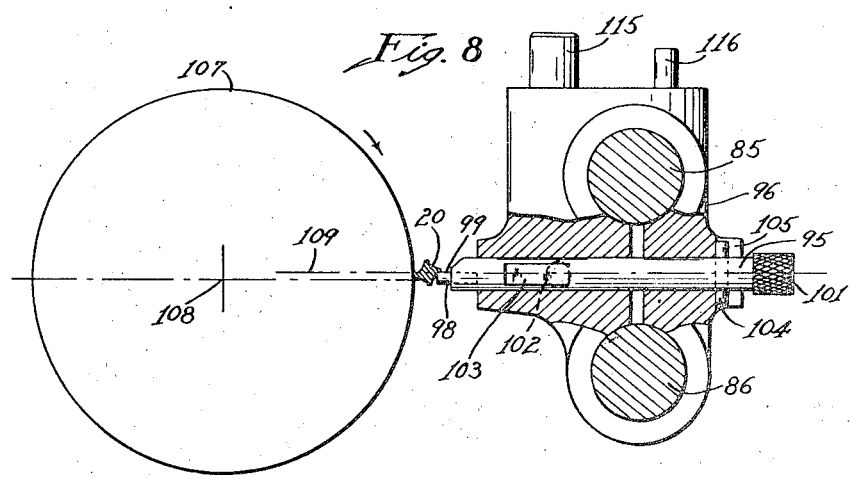
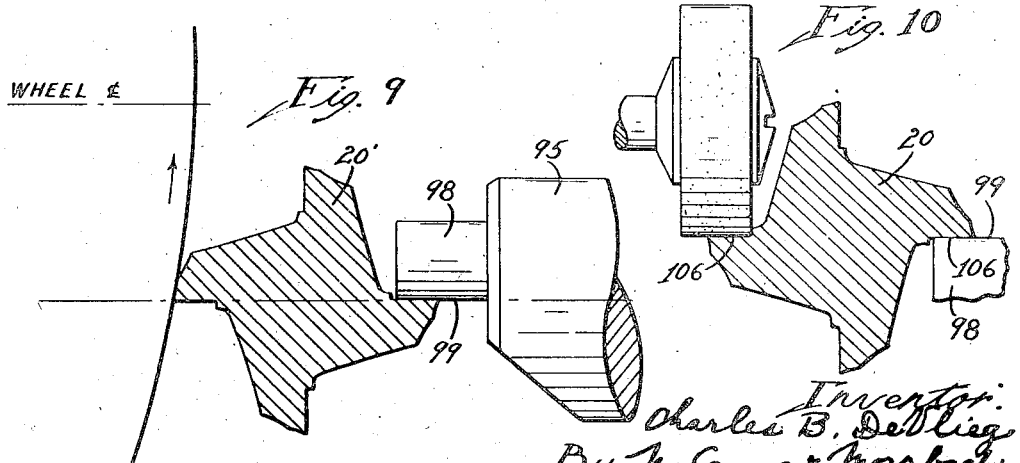

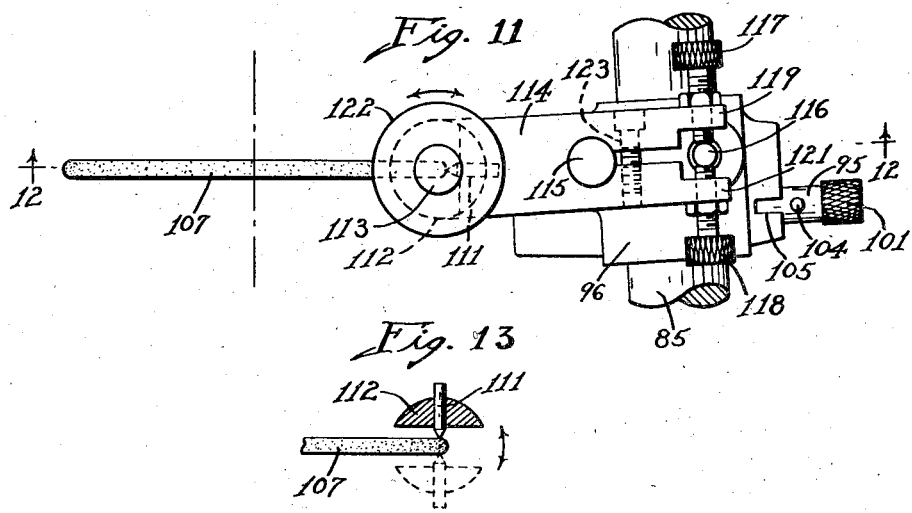
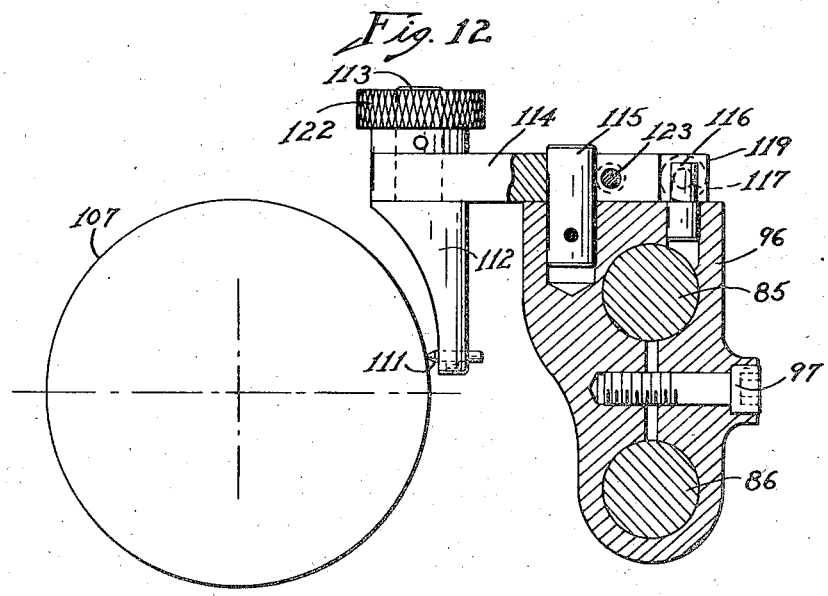

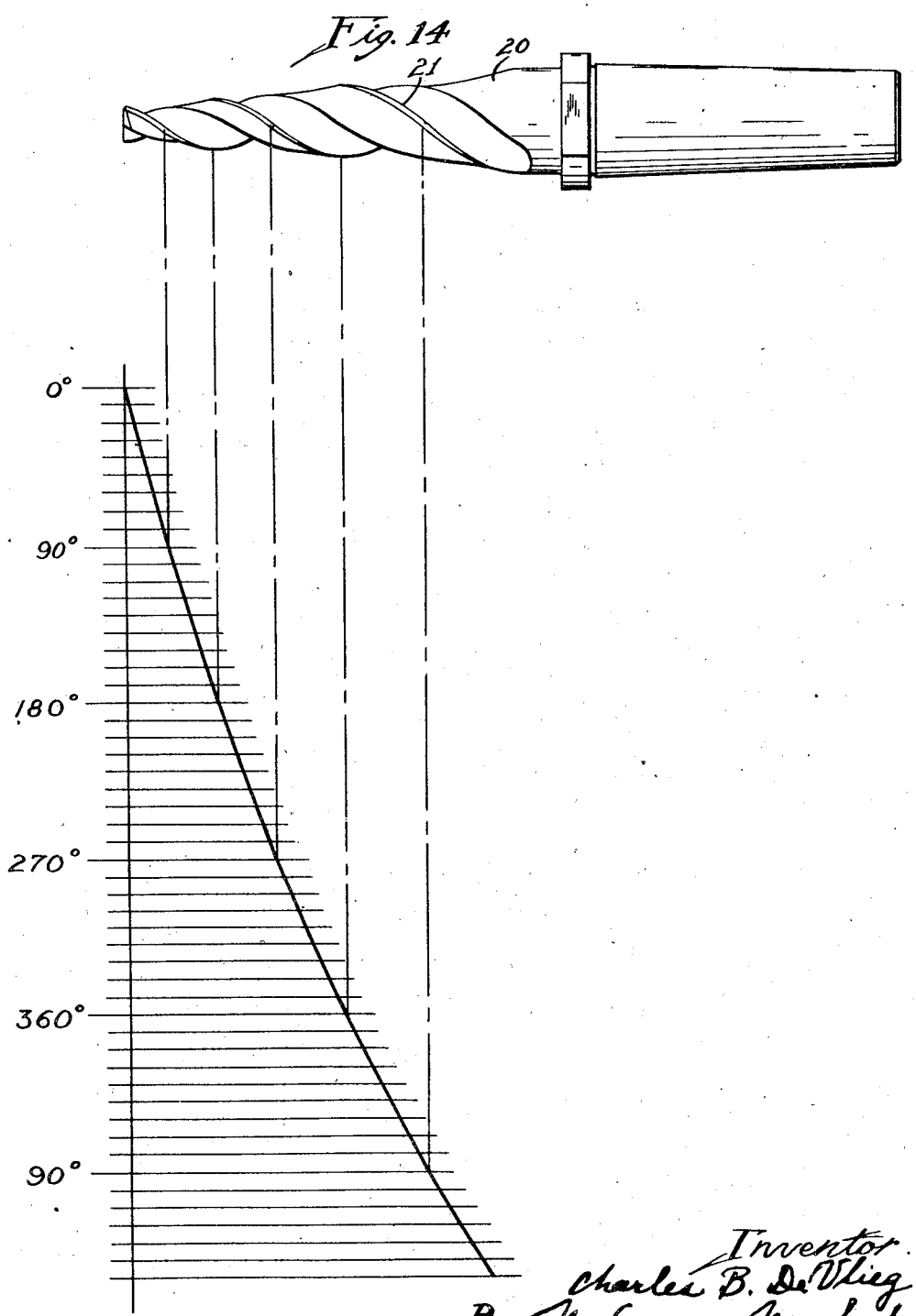

Patented June 17, 1947

2,422,475

UNITED STATES PATENT OFFICE 2,422,475

METHOD OF AND MACHINE FOR GRINDING

Charles B. De Vlieg, Birmingham, Mich., assignor to Vane Wheel Company, Cleveland, Ohio, a corporation of Michigan Application May 11, 1944, Serial No. 535,035

18 Claims. (Cl. 51—225)

1

This invention relates to the art of grinding rotary metal cutting tools such as milling cutters, reamers, and the like.

Heretofore it was common practice in the cutter grinding art to employ methods depending on human skill in conjunction with machine operation to control the grinding of the individual blades of a cutter. In such practice the cutter tooth being ground was manually held against a tooth rest and guided by such rest throughout the grinding from end to end of such tooth or blade. It was not uncommon, therefore, for a workman thus depending on his skill to grind more off a cutter than was necessary to properly sharpen the edge, and this was particularly so in the case of an irregularly worn cutter. Also, minute variables entered into such grinding practice inherent in the varying degrees of skill and application of individual workmen.

The present invention aims to overcome the manual skill dependency in such prior grinding practices. My invention is premised on the preception that a milling cutter, or reamer, or other such metal cutting tool, can only mill a surface in strict accordance with the form and finish of its cutting edge. Under this control a constant face angle and constant diameter relief are obtained, both of extreme accuracy and very smooth finish. This improves the cutting accuracy and finish of work performed by the cutter. It also has an important bearing on the life of the cutter because the accurate control of the grinding of the cutting edge serves to require less reduction in dimension to obtain the desired sharp edge. This gives a greater number of grinds per cutter. Another new result from the present embodiment of my invention is the grinding or milling of tapered fluted cutters so as to provide a constant face angle with blades of variable lead so that the desired accurate cutting edge can be produced throughout the length of the cutter as distinguished from prior tapered cutters having a constant lead and a variable face angle from end to end.

In furtherance of the foregoing I have provided a new and improved method and machine for grinding rotary cutters and also for milling such cutters.

Another object is to provide a cutter grinding or milling machine of the character described comprising a new combination of elements making for simplicity of construction and operation.

Another object is to provide a cutter grinding machine of simplified design capable of manufacture at a comparatively low cost.

2

Other objects and attendant advantages will be appreciated by those skilled in this art as the invention becomes better understood by reference to the following description when considered in connection with the accompanying drawings, in which—

Figure 1 is a plan view of a cutter grinding machine embodying my invention;

Figs. 2 and 3 are side elevations of the machine, as seen from opposite sides of Fig. 1;

Fig. 4 is a longitudinal section taken substantially on the section line 4—4 of Fig. 1, on an enlarged scale;

Fig. 5 is an end view, at the left hand end of Fig. 4;

Fig. 6 is a cross-section taken substantially on the section line 6—6 of Fig. 4;

Fig. 7 is a horizontal section through the cutter location means with relation to a cutter and a grinding wheel;

Fig. 8 is a section substantially on the section line 8—8 of Fig. 7;

Fig. 9 is an enlarged detail view showing the locating pin and grinding wheel with relation to a left hand cutter as compared with a cutter having a right hand lead shown in the previous views;

Fig. 10 is a similar enlarged detail view showing a grinder positioned for grinding the face of the cutter shown in Fig. 9;

Fig. 11 is a detail plan view showing the wheel dresser means in relation to a grinding wheel;

Fig. 12 is a vertical section substantially on the section line 12—12 of Fig. 11;

Fig. 13 is a detail horizontal section illustrating extreme positions of the wheel dressing element; and Fig. 14 is a diagrammatic view of a spiral cutter adapted to be ground according to my invention, illustrating the uniform face angle throughout the length of the cutter.

Before considering a detailed description of my invention it should be borne in mind that the embodiment shown in the drawings, is illustrative of the principle and that this may be applied in other forms. Also, it should be borne in mind that the simple construction herein disclosed is of real utility and advantage in everyday practice.

The invention will be better understood by referring first to the tapered fluted milling cutter 20 shown in Fig. 14. It will be observed that the spiral cutting edge 21 is designed to have a variable lead but a constant face angle throughout its length. My invention, however, is not limited to a tapered cutter but may be applied in the grinding of plain or irregular forms, as will be presently apparent. According to my invention means is provided for obtaining minutely accurate control in grinding both the face and land or clearance surfaces to produce a much improved finish and accuracy in the cutting edge as compared with prior methods. This contrasts particularly with the well known prior common practice wherein the operator by manual pressure maintains the cutter face against the tooth rest and thereby maintains the operating relation between the grinding wheel and the cutter. This prior method inherently depends on the touch or pressure applied by the operator and not infrequently results in the delicate edge of the cutter being burned or in causing a slight burr to be thrown up on the critical front face. This is due in part to the variable hand pressure and also to the turning of the grinding wheel toward the cutting edge. In my invention the grinding wheel turns away from the cutting edge so as to always leave the edge clean and sharp and the grinding wheel is mechanically operated and controlled at all times so as to produce a predetermined grinding effect giving a constant face angle regardless of variable lead of the cutter blades.

The cutter is preferably held between a spindle designated generally by 31 and a tailstock center 32, with the cutter centered and driven by the spindle. The spindle is accurately supported for rotation in bearings 33—34 in a housing 35 which is carried on a slide 36 which in turn is mounted for movement lengthwise on a base 37. As shown in Figure 6, the slide rests on flat ways 38—39 on the base and is guided by bevel ways 41 and a gib 42. These ways extend substantially the full length of the base and the slide. Suitable means such as a compression spring 43 constantly urges the slide to the left, viewing Figure 4, to maintain a slide-carried cam against a base-carried roller and thereby accurately control the lengthwise position of the slide on the base and consequently the lengthwise position of the cutter with respect to a grinding wheel, as will be presently described. The spring 43, supported on a rod 44, acts between a bracket 45 fixed to the base and a thrust bracket 46 fixed to the slide. In this case two such slide-actuating springs are used. The spindle projects beyond the rear end of the housing 35 and has removably mounted but keyed thereon an index plate hub 47 and a bushing 48 on which is supported a cam hub 49. A nut 51 threaded on the end of the spindle acts against an end plate 52 to hold the parts 47—48—49 in abutting relation and to draw the spindle endwise to hold its shoulder 53 against the inner race collar of the bearing 34. A bevel gear 54 is attached by means of a locating pin 55 and bolts 56 to an index plate 57 which is integral with the hub 47. A pinion 58 meshing with the gear 58 is fixed to a shaft 59 which in turn has suitable bearing support at 61 on the housing 35 and carries a hand crank 62. A drum type cam designated generally by 63 removably attached to the hub 49 by means of a locating pin 64 and bolts 65 has a cam face coacting with a roller 66. This roller is carried on a stud 67 which is fixed to a block 68 which in turn is mounted on the ways 38—39—41 on the base and is fixedly clamped thereto through a short gib 69. Indexing means is provided between the index plate 57 and the cam drum for relatively indexing these parts in 90° movements to correspond with the four equally spaced cutter flutes or channels of the cutter 20. This means comprises an index plunger 71 slidable in a retainer 72 on the cam drum into and out of engagement with any of the locating slots 72 in the face of the index plate 57. A spring 74 urges the index plunger into such engagement and the plunger may be manually withdrawn by means of the upstanding pin or knob 75.

The cam drum has a cam face 76 the lead of which is identical with that of the cutter and the development of which is shown in Figure 14. The cam face is especially designed for each cutter to control with minute accuracy the axial travel of the cutter with relation to the grinding wheel and with relation to rotative movement of the cutter, to maintain the desired constant face angle throughout the length of the blade as it is being ground.

Referring now to the tailstock, the center 32 is slidable in a bushing in the cylindrical portion 81 of a bracket 82 which is provided with cylindrical portions 83 and 84 which receive supporting rods or tubes 85 and 86. These rods are fixedly and rigidly supported at one end in suitable socket mountings 87 in the housing 35, the rods being spaced apart one above the other in a vertical plane which is parallel with but laterally offset from a vertical plane through the spindle axis, as shown in Figure 1. The tailstock center is coaxial with the spindle and medially between the rods 85 and 86 as viewed from the side, Figures 2 and 3. A clamp screw 88 clamps the bracket 82 to the rods 85—86 at any position of the bracket lengthwise on the rods. The tailstock center 32 may be moved lengthwise in the bracket 81 against the tension of a compression spring 89 into centering position by means of a hand knob 91 and locked in such position by means of the clamping screw 92. Bushings 92 and 93 in the bracket 81 provide for accurate support of the tailstock center and a pin 94 maintains it against rotative displacement, as shown in Figure 4.

Means is provided for accurately locating the cutter rotatively in the spindle when setting up. This comprises a plunger 95 mounted for lengthwise movement in a bracket 96 which in turn is mounted for lengthwise adjustment on the rods 85—86 and is adapted to be clamped thereto by the clamping screw 97. As shown in Figure 2 the locator plunger 95 is on a horizontal axis intermediate the rods 85—86 and in the horizontal plane of the spindle 31. As shown in Figures 8 and 9 the plunger is provided at its inner end with a locator pin 98 which has a locator face 99 in a plane intersecting the plunger axis and coplanar with the spindle axis. The parts are arranged so that by grasping the knob end 101 of the plunger it may be moved out and in to position the locator pin. A spring pressed detent 102 bears against either of the flats 103 on the plunger to yieldingly hold the plunger in its cutter locating position, shown in Figures 1, 7, and 8; or in its withdrawn position shown in Figure 11 in which the locator pin is remote from the cutter. This is the position while grinding. A pin 104 on the plunger engages in a vertical slot 105 in the bracket to maintain the face 99 in a horizontal plane when in operative position. By rotating the plunger 180° when withdrawn, its pin 98 may be positioned as shown in Figure 9 to coact with a cutter 20' having a left hand lead as distinguished from cutter 20 which has a right hand lead.

When setting up the machine for a new grinding job the cutter 20 and the locator pin 98 are positioned in coacting relation as shown in Figures 1, 7, and 8, preferably with the locator pin intermediate the ends of the cutter blades and with its face 99 seated against the radial face 100 of the adjacent blade (Figure 10). This relationship may be effected in various ways and in actual practice the steps may be as follows: insert the cutter in the spindle; extend the cutter to the locator plunger, then rotate the cutter against the face of the locator finger 98 and lock the cutter in the spindle; and then enter the center support 32 in the adjacent end of the cutter. A relationship is thus established between this locating point and the described indexing means so that upon each indexing the cutter will be repositioned exactly 90° and each blade at the transverse plane intersecting the said locating point will be moved in succession to the identical location (assuming the locator plunger has been withdrawn). This location set-up is also used as a gauge for the purpose of setting a grinding wheel 107 in proper relation to the cutter blade surface to be ground. In the case of a tapered fluted cutter such as 20 a grinding wheel of proper shape is set with its axis of rotation 108 parallel with a plane passing through the high points of the blades at a side of the cutter diametrically opposite from the locator pin face 99. Also the grinder wheel is preferably set so that its said axis of rotation 108 is slightly below the horizontal plane 109 of the cutter. This location provides the clearance angle at the peripheral edge of the cutter blade produced by the grinding action of the peripheral face of the grinding wheel. It will also be observed, Figures 1 and 7, that the grinding wheel is aligned with the locating face of the locator pin. The grinding wheel will be set to operate in this fixed position. The locator plunger will be withdrawn. The hand crank 62 may now be turned to traverse the cutter lengthwise across the grinding wheel and to simultaneously rotate the cutter so as to continuously present the land edge of the selected blade to the grinding wheel from end to end of the blade. It will be observed that the grinding wheel and the cutter are supported in definite relation one with respect to the other throughout the entire grinding operation and there is no variable such as manual pressure or skill to disturb or vary the constancy of this relationship. Therefore, in view of the accuracy in the support of the cutter, the grinding is effected under minutely accurate control so as to produce unvarying depth from end to end of each blade. It will also be observed that by reason of the design of the cam face with relation to the lead of the cutter blades the face angle of each cutting blade will be constant at all points in its length. Thus, with constant face angle and constant depth of grinding at every point in the length of each blade the cutting edges are finished to an unvarying high degree of precision and accuracy. It will be further observed that with my invention the grinding wheel will always be operated to grind into the cutting edge as distinguished from prior practices employing a tooth rest wherein the grinding wheel rotates in the opposite direction and therefore grinds away from the cutting edge in order to maintain turning thrust of the cutter against the tooth rest. With my invention a smooth, sharp, finished cutting edge is produced as distinguished from the tendency to burr the edges under the prior practice. This also eliminates the need for honing or refinishing to smooth the burred edges.

Another feature of my invention is the provision of novel means for dressing the grinding wheel. Referring to Figures 11, 12, and 13, I have combined this wheel dressing means with the locating plunger support. A dresser point 111 is mounted on a horizontally disposed axis on the lower end of a dresser stud 112 which has a reduced end 113 mounted for rotative movement about a vertical axis in a supporting arm 114 which in turn is mounted on top of the bracket 96. Means is provided for accurately adjusting the dresser pin horizontally to align it with the grinding wheel comprising a pin 115 fixed in the bracket 96 and to which the arm 114 is accurately fitted for rotative movement thereon, a pin 116 also fixed to the bracket 96 and engaged at opposite sides by adjusting screws 117—118 which are threaded through the bifurcated portions 119—121 of the arm 114. By adjustment of the screws 117—118 in coaction with the fixed pin 116 the dresser point 111 may be accurately set with relation to the grinding wheel so that by rotatively moving the dresser stud 112 through manual turning of the knob 122 in opposite directions the dresser point may be traversed through a perfect arc from side to side of the grinding wheel as shown in Figure 13. The desired setting may be made fixed and rigid by locking the screws 117—118. The screw 123 tightens the bifurcated arm 114 on the pin 115 to take up any lost motion. A flat faced grinding wheel may be dressed by moving the bracket 96 lengthwise on the bed through means of the hand crank 62, it being understood that the wheel would be set with its face parallel with the plane in which the bracket 96 travels.

It will now be observed that the dresser point 111 is mounted in predetermined relation to the locating pin 98 so that when the cutter has been set in the spindle chuck by means of the pin 98 in the described relation to the indexing means, the bracket 96 together with the assembled parts on the slide 36 may be moved to the left (viewing Figure 1) to position the dresser point in the described coaction with the grinding wheel. In this position the locating plunger will be withdrawn, the grinding wheel may be positioned close to the cutter center adjacent to the tailstock, and the dresser point will be located above the cutter center as shown in Figure 12. After finishing the dressing operation the dresser point assembly comprising the supporting arm 114, the dresser stud 112 and the screws 117, 118, and 123 should be removed.

In the practice of my invention each cutter if it differs in design from another, will have a cam drum similar to 63 provided with a cam especially designed to produce lengthwise feed of the slide 36 and the cutter in predetermined relation to rotation of the cutter so as to accurately traverse the cutter across the grinding wheel to produce a constant face angle and constant diameter relief for the design characteristics of the particular cutter. This result is positively attained without variables and without dependence on human skill. There are no variables incidental to backlash in gearing or other motion transmitting connections or as a consequence of manual skill in maintaining an operative relation between the cutter and the grinding wheel as in the prior art tooth rest methods. Backlash is eliminated because the springs 63 maintain constant pressure between the cam 76 and the roller 66 and thus insure precision movement of the cutter. Furthermore, the cam is designed as shown by the development angle in Figure 14 to produce a constant angle face by rotation of the cutter according to the face angle of the cam. As shown by the development of the cam face, each quarter revolution of the cam produces a controlled longitudinal or axial feed of the cutter which compensates for the varying lead of the flutes or blades. By turning the hand wheel 62 the slide 36 together with the cutter will be traversed to the right across the grinding wheel and by reversing the wheel 62 the cutter may be traversed in the opposite direction, grinding from end to end along the clearance angle edge of the blade. When this edge is ground the index pin 71 will be withdrawn and indexed 90° to the next slot 73, thus accurately positioning the next blade in the identical relation to the grinding wheel as the preceding blade. The grinding is then repeated; and in similar manner the remaining blades are ground. The operations for grinding the face 106 of the cutter are the same as above described except that a face cutter 124 is used, as shown in Figure 10.

Where the cutter has a left hand lead as distinguished from the right hand lead of the cutter 20, the locating finger 98 will be turned 180° as shown in Figure 9, to engage the face of the tooth or blade of such a left hand cutter 20'.

When the cutter to be ground is of uniform diameter the spindle axis will be adjusted to a position parallel with the path of the slide movement; and in each case where the cutter has a different angular face or taper, the spindle housing 35 will be adjusted or set so that the edge adjacent to the grinding wheel lies in a plane parallel with the slide movement.

It is believed that the foregoing conveys a clear understanding of the objects prefaced above and while I have shown a particular embodiment of my invention, it should be understood that I do not wish to be limited thereto since many modifications may be made, and I therefore contemplate by the appended claims to cover any such modifications as fall within the true spirit and scope of my invention.

I claim:

1. A machine for grinding a fluted tapered cutter having a variable lead and a constant face angle, comprising a rotating grinding wheel, and means for traversing the cutter lengthwise across the grinding wheel with the plane of the tapered side of the cutter parallel with the axis of rotation of the grinding wheel and for simultaneously rotating the cutter including a rotary cam drum coaxial and fixed with relation to the cutter and having a cam face shaped to control said lengthwise traverse of the cutter to grind a constant face angle from end to end of each blade and to accurately present each similar face of each blade in identical grinding relation to the grinding wheel, and including indexing means operative between the grinding wheel and the spindle to index the spindle and the cutter with relation to the grinding wheel to accurately present each similar face of a cutter blade in identical grinding relation to the grinding wheel, and means to locate the cutter in predetermined relation to said cam drum and said indexing means including a locating finger engageable with a tooth face of the cutter while the cutter is free for rotative positioning of the cutter in the spindle to obtain said predetermined relationship.

2. A machine of the character described comprising a base, a slide mounted for movement lengthwise on the base, a housing on the slide, a spindle journaled in the housing to rotate about an axis extending lengthwise of the base and having a work-piece holder at one end, a tailstock on the slide opposite from the work-piece holder, a cam drum supported on the spindle at the end thereof opposite from the cutter holder having a helical cam face, a roller fixed with respect to the base coacting with the cam face, means acting against the slide to constantly urge it in a direction to maintain the cam face in coaction with the roller, an index plate fixed to the spindle, means operative between the index plate and the cam drum to index the cam drum with respect to the index plate, and means to rotatively move the index plate and the spindle, the cam face being of predetermined shape to accurately effect lengthwise feed of the slide at a controlled rate in relation to rotative movement of the spindle whereby to effect minutely accurate control of a workpiece with relation to a grinding or milling cutter.

3. A cutter grinding machine comprising, in combination, a base, a slide mounted for movement lengthwise on the base, a housing on the slide, a spindle journaled in the housing to rotate about an axis extending lengthwise of the base and having a cutter holder at one end, a tailstock on the slide opposite from the cutter holder, a cutter grinding wheel supported between said cutter holder and tailstock, a cam drum on the spindle at the end thereof opposite from the cutter holder having a helical cam face, a roller fixed with respect to the base coacting with said cam face, means for imparting rotative movement to the spindle and cam whereby the coacting cam and roller cause lengthwise and rotative movement of the cutter with respect to the grinding wheel in a grinding operation, the cam face controlling lengthwise movement of the cutter to maintain a constant face angle, means for indexing the cam with respect to the spindle according to the number and spacing of the cutter teeth, said means for imparting rotative movement to the spindle comprising a bevel gear coaxial with the spindle and interposed between the housing and the cam drum, and means having a pinion meshing with the bevel gear rotating it and the spindle.

4. A cutter grinding machine for grinding in succession the teeth of a fluted cutter comprising, in combination, a base, a slide mounted for movement lengthwise on the base, a housing on the slide, a spindle journaled in the housing to rotate about an axis extending lengthwise of the base and having a cutter holder at one end, a tailstock on the slide opposite from the cutter holder, a cutter grinding wheel supported between said cutter holder and tailstock, a cam drum on the spindle at the end thereof opposite from the cutter holder having a cam face, a roller fixed with respect to the base coacting with said cam face, means for imparting rotative movement to the spindle and cam whereby the coacting cam and roller cause lengthwise and rotative movement of the cutter with respect to the grinding wheel in a grinding operation, means for indexing the cam with respect to the spindle according to the number and spacing of the cutter teeth, the cam face being designed to conform with the lead of the cutter teeth and adapted to function in a complete tooth grinding operation for each setting of the indexing means, the indexing means comprising an indexing plate rotative with the spindle, and means mounted on the cam drum operative to effect indexing connection with the indexing plate.

5. A cutter grinding machine comprising, in combination, a base, a slide mounted for movement lengthwise on the base, a housing on the slide, a spindle journaled in the housing to rotate about an axis extending lengthwise of the base and having a cutter holder at one end, a tailstock on the slide opposite from the cutter holder, a cutter grinding wheel supported between said cutter holder and tailstock, a cam drum on the spindle at the end thereof opposite from the cutter holder having a helical cam face, a roller fixed with respect to the base coacting with said cam face, means for imparting rotative movement to the spindle and cam whereby the coacting cam and roller cause lengthwise and rotative movement of the cutter with respect to the grinding wheel in a grinding operation, the cam face controlling lengthwise movement of the cutter to maintain a constant face angle, means for indexing the cam with respect to the spindle according to the number and spacing of the cutter teeth, the indexing means comprising an indexing plate rotative with the spindle, and means mounted on the cam drum operative for indexing connection with the indexing plate, said means for imparting rotative movement to the spindle comprising a bevel gear coaxial with the spindle and fixed with respect to the indexing plate and a hand crank on the housing having a pinion meshing with the bevel gear.

6. A cutter grinding machine comprising, in combination, a base, a slide mounted for movement lengthwise on the base, a housing on the slide, a spindle journaled in the housing to rotate about an axis extending lengthwise of the base and having a cutter holder at one end, a tailstock on the slide opposite from the cutter holder, a cutter grinding wheel supported between said cutter holder and tailstock, a cam drum on the spindle at the end thereof opposite from the cutter holder having a helical cam face, a roller fixed with respect to the base coacting with said cam face, means for imparting rotative movement to the spindle and cam whereby the coacting cam and roller cause lengthwise and rotative movement of the cutter with respect to the grinding wheel in a grinding operation, the cam face controlling lengthwise movement of the cutter to maintain a constant face angle, means for indexing the cam with respect to the spindle according to the number and spacing of the cutter teeth, and a locator pin and means mounting the same on the slide in coacting relation to the cutter for movement between an operative position in which the pin engages a cutter tooth face and locates the rotative position of the cutter with respect to its indexed position and an inoperative position in which the locator pin is retracted from the cutter.

7. A cutter grinding machine comprising, in combination, a base, a slide mounted for movement lengthwise on the base, a housing on the slide, a spindle journaled in the housing to rotate about an axis extending lengthwise of the base and having a cutter holder at one end, a tailstock on the slide opposite from the cutter holder, a cutter grinding wheel supported between said cutter holder and tailstock, a cam drum on the spindle at the end thereof opposite from the cutter holder having a helical cam face, a roller fixed with respect to the base coacting with said cam face, means for imparting rotative movement to the spindle and cam whereby the coacting cam and roller cause lengthwise and rotative movement of the cutter with respect to the grinding wheel in a grinding operation, the cam face controlling lengthwise movement of the cutter to maintain a constant face angle, means for indexing the cam with respect to the spindle according to the number and spacing of the cutter teeth, the tailstock being mounted on a bracket which is supported upon and clamped to a pair of vertically spaced horizontal rods which in turn are fixedly supported at one end on the spindle housing, said rods being parallel with the spindle axis, and the tailstock bracket being adjustable lengthwise on said rods.

8. A cutter grinding machine comprising, in combination, a base, a slide mounted for movement lengthwise on the base, a housing on the slide, a spindle journaled in the housing to rotate about an axis extending lengthwise of the base and having a cutter holder at one end, a tailstock on the slide opposite from the cutter holder, a cutter grinding wheel supported between said cutter holder and tailstock, a cam drum on the spindle at the end thereof opposite from the cutter holder having a helical cam face, a roller fixed with respect to the base coacting with said cam face, means for imparting rotative movement to the spindle and cam whereby the coacting cam and roller cause lengthwise and rotative movement of the cutter with respect to the grinding wheel in a grinding operation, the cam face controlling lengthwise movement of the cutter to maintain a constant face angle, means for indexing the cam with respect to the spindle according to the number and spacing of the cutter teeth, a locator pin adapted for coaction with a face of the cutter to locate the rotative position of the cutter with relation to its indexed position, a bracket in which the locator pin is mounted, a pair of vertically spaced horizontal rods on which the bracket is clamped, the rods being parallel with the spindle axis and fixedly mounted at one end on the spindle housing, and a retractable plunger on the bracket intermediate the rods carrying at one end the said locating pin.

9. A cutter grinding machine comprising, in combination, a grinding wheel, a rotary spindle having a cutter holder at one end in which a toothed cutter to be ground is adapted to be inserted coaxially therein and rotatively adjusted with respect to the spindle and locked to the spindle in said adjusted position when setting up, means supporting the spindle for movement axially in a feed stroke with respect to the grinding wheel, means for so moving the spindle axially, indexing means including an indexing plate coaxial with the spindle and fixed to rotate therewith, a drum type cam coaxial with the spindle and indexable in coaction with said index plate, said cam having a cam surface for determining rate of axial movement of the spindle and cutter with relation to rotation thereof, a locator member supported in a fixed position with relation to the spindle having a locator face arranged to be moved into a locating position in predetermined relation to the indexing means to establish a fixed relationship between said locating position and the cam when the indexing means is set at a starting position, the cutter being rotatively adjustable in the spindle when setting up to position one of its cutting faces against the locating member to thereby set the cutter with relation to the indexing means, the locator member being held out of its said locating position when the spindle is operated to move the cutter in a grinding stroke with respect to the grinding wheel.

10. A cutter grinding machine as set forth in claim 9, in which the locator member is mounted for rotative adjustment and its locator face is adapted to be shifted by such adjustment to face the locating position from either of opposite sides.

11. A cutter grinding machine as set forth in claim 9, in which the locator member is in the form of a plunger on an axis normal to the spindle-cutter axis and approximately coplanar therewith, the locator face being on a portion of the plunger located at one side of said plane, and means whereby the plunger may be moved axially to move its locator face into and out of the locating position.

12. A cutter grinding machine as set forth in claim 9, in which the locator member is in the form of a plunger on an axis normal to the spindle-cutter axis and approximately coplanar therewith, the locator face being on a portion of the plunger located at one side of said plane, and means whereby the plunger may be moved axially to move its locator face into and out of the locating position and whereby the plunger may be moved rotatively to shift the locator face so that it faces the locating position from either of opposite sides.

13. A cutter grinding machine as set forth in claim 9, including means constantly urging the spindle and the parts associated in coaxial relation therewith axially in one direction, a stationary cam follower engaging the cam surface of the drum type cam and maintained in such engagement by the last named means.

14. A cutter grinding machine as set forth in claim 9, including means constantly urging the spindle and the parts associated in coaxial relation therewith axially in one direction, a stationary cam follower engaging the cam surface of the drum type cam and maintained in such engagement by the last named means and said means for moving the spindle axially comprising a gear coaxial with the spindle and fixed thereto, and an operating member having a gear connection to said spindle gear and operable for rotating the spindle.

15. The method of grinding a fluted cutter, comprising supporting the cutter for rotative movement about its axis and for movement in a feed stroke lengthwise of its axis, supporting a grinding wheel in a fixed grinding relation to the cutter for grinding an edge face of a tooth when the cutter is moved in the feed stroke, indexing the cutter by indexing means to present each tooth in predetermined relation to the grinding wheel in which relationship the feed stroke is repeated, accurately controlling the position of the cutter with respect to bodily movement rotatively about its axis throughout each feed stroke to maintain the cutter tooth in predetermined relation to the cutter, and presetting the cutter rotatively with respect to said indexing relation by means of a locating face supported in predetermined relation to said indexing means and operable to be moved into and out of locating engagement with a cutter tooth, and permitting said cutter to be rotatively set with relation to said indexing means in response to the locating engagement with said locating face.

16. A cutter grinding machine for grinding in succession the teeth of a fluted cutter comprising, in combination, a grinding wheel, a rotary spindle, means for rotating the cutter with the spindle and permitting rotative adjustment of the cutter with respect to the spindle when setting up, a cam, indexing means connecting the cam for movement with rotation of the spindle, the cam having a cam surface designed to conform with the lead of the cutter teeth and adapted to function in a complete tooth grinding operation for each setting of the indexing means, a fixed cam follower coacting with the cam, means for rotating the spindle and causing lengthwise movement thereof together with the cutter in a feed stroke, and locator means designed to be set in coacting location with the face of a selected cutter tooth to locate the rotative position of the cutter with relation to the indexing means when setting up the cutter with relation to the spindle.

17. A cutter grinding machine as set forth in claim 16, including means constantly urging the cam surface in coacting engagement with the cam follower during movement of the spindle axially in both directions.

18. A cutter grinding machine as set forth in claim 16, in which the cam is of the drum type and both the cam drum and the indexing means are arranged coaxial with respect to the spindle, and in which the indexing means includes an indexing plate fixed to rotate with the spindle and the cam drum is arranged to be rotatively indexed with respect to the index plate.

CHARLES B. DE VLIEG.

REFERENCES CITED

The following references are of record in the file of this patent:

UNITED STATES PATENTS

| Number | Name | Date |
|---|---|---|
| 1,528,188 | Frost | Mar. 3, 1925 |
| 286,663 | Wheeler | Oct. 16, 1883 |
| 490,588 | Palmer et al. | Jan. 24, 1893 |
| 2,328,549 | Eich et al. | Sept. 7, 1943 |
| 1,314,154 | Scrivenor | Aug. 26, 1919 |
| 1,698,807 | Willhauck | Jan. 15, 1929 |
| 2,332,510 | Franzen | Oct. 26, 1943 |

FOREIGN PATENTS

| Number | Country | Date |
|---|---|---|
| 516,740 | Germany | Jan. 30, 1931 |